United States Patent
Hahmann et al.

[11] Patent Number: 6,074,559
[45] Date of Patent: *Jun. 13, 2000

[54] FILTER DEVICE HAVING A HOLLOW FIBER BUNDLE AND ASSOCIATED SEALING DEVICES

[75] Inventors: Uwe Hahmann; Klaus Heilmann; Michael Schönhofen; Gerhard Wiesen, all of St. Wendel, Germany

[73] Assignee: Fresenius Medical Care Deutschland GmbH, Bad Homburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/976,156

[22] Filed: Nov. 12, 1997

[30] Foreign Application Priority Data

| | | | |
|---|---|---|---|
| Nov. 21, 1996 | [DE] | Germany | 196 48 275 |
| Nov. 21, 1996 | [DE] | Germany | 196 48 276 |
| Jun. 26, 1997 | [DE] | Germany | 197 27 250 |
| Oct. 7, 1997 | [DE] | Germany | 197 44 336 |

[51] Int. Cl.[7] .......................... B01D 61/24; B01D 61/28; B01D 63/02
[52] U.S. Cl. ............... 210/645; 210/321.79; 210/321.8; 210/321.88; 210/321.89; 210/450; 210/455; 210/500.23; 210/646
[58] Field of Search ....................... 210/645, 646, 210/321.79, 321.8, 321.88, 321.89, 450, 455, 500.23

[56] References Cited

U.S. PATENT DOCUMENTS

| | | | |
|---|---|---|---|
| 4,265,763 | 5/1981 | Bollinger et al. | 210/323.2 |
| 4,640,773 | 2/1987 | Nishida et al. | 210/433.2 |
| 4,686,039 | 8/1987 | Otstot et al. | 210/433.2 |
| 5,192,499 | 3/1993 | Sakai et al. | 422/46 |
| 5,282,964 | 2/1994 | Young et al. | 210/321.8 |
| 5,472,601 | 12/1995 | Eguchi | 210/321.8 |

FOREIGN PATENT DOCUMENTS

| | | |
|---|---|---|
| 0 305 687 | 3/1989 | European Pat. Off. . |
| 305 672 | 3/1989 | European Pat. Off. . |
| 30 39 307 | 4/1981 | Germany . |
| 2646358 | 5/1982 | Germany . |
| 40 36 978 | 5/1992 | Germany . |
| 2 135 902 | 9/1984 | United Kingdom . |

*Primary Examiner*—John Kim
*Attorney, Agent, or Firm*—Kenyon & Kenyon

[57] ABSTRACT

A filter device has two flow paths. The first flow path has at least one cap and fluid port. The second flow path surrounds the first fluid flow path and has at least one cap that overlaps the cap of the first fluid flow path. The second flow path also has at least one fluid port. The filter device provides a simple arrangement that is easily disinfected or sterilized.

49 Claims, 6 Drawing Sheets

FILTER DEVICE HAVING A HOLLOW FIBER BUNDLE AND ASSOCIATED SEALING DEVICES

FIELD OF THE INVENTION

The invention relates to a filter device having two flow spaces, of which a first space, preferably a permeate space, is formed by the tubular or capillary tube passages of a hollow-fiber bundle poured at its ends into a molding compound, and a second space, preferably a filtrate space, is formed by a housing enclosing the fiber bundle, the first space being sealed off by caps, placed on the molding compounds, with sealing devices running over the peripheral areas of said molding compounds, and the molding compounds being braced against the housing.

BACKGROUND OF THE INVENTION

The German laid open print 26 46 358 discloses a filter device in which the hollow-fiber bundle encloses a central conduit in a ring-like manner, and the ends of the ring-shaped hollow-fiber bundle are sealed off by a molding compound both with respect to the central conduit and with respect to the housing casing concentrically enclosing it.

Another known filter device likewise comprises a tubular housing which encloses the hollow-fiber bundle, the ends of the hollow-fiber bundle being joined to the ends of the tubular housing by a molding compound. In this filter device, the housing is provided in each case with radial connection pieces, adjacent to the molding compounds, which form the inlets and outlets to the second flow space. The capillary tubes of the hollow-fiber bundle enclosed by the molding compounds are cut at their end faces to open them. Caps provided with connection pieces which form the inlets and outlets of the first flow space are then placed sealingly on the ends of the tubular casing.

These known filter devices are used, for example, as capillary dialyzers, the flow spaces formed by the capillary-tube passages forming the blood chamber, and the housing enclosing the hollow-fiber bundle forming the dialysate chamber in which the dialysate flows around the hollow fibers.

The problem existing in the known filter devices is that the molding compound, usually made of PU [polyurethane fiber], which hardens in a disk shape and forms a sealing between the two flow spaces, shrinks when hardening, so that stresses develop in the disk-shaped sealings formed by the molding compounds which can lead to cracks and even detachments of the molding compounds from the housing casing enclosing them. As a result, the two flow spaces are no longer completely sealed off from one another, and the adhesion of the sealing compounds to the housing enclosing the fiber bundle, said adhesion producing the seal, is no longer reliably assured.

In a filter device of the type indicated at the outset disclosed by EP 0 305 687 B1, the disk-shaped molding compounds are enclosed by interposed rings to which the molding compounds do not adhere, so that they can shrink free of stress. This stress-free shrinking prevents cracks in the disk-shaped molding compounds, and makes it possible to dispense with a direct sealing between the peripheral edge of the sealing compounds and the housing enclosing them. To nevertheless maintain a sealing between the two flow spaces, the first space is sealed off by caps placed on the molding compound, and specifically by sealing devices which run over the edge area of the molding compound and against which the caps are pressed.

In this known filter device, the problem now exists of producing a connection to the second space formed by the housing enclosing the fiber bundle. This connection is produced in the known filter device, in that the diameter of the tubular housing is widened at its end areas more or less in the manner of a sleeve, these widened areas being provided with radial connection pieces. These connection pieces open through into the second space formed by the housing, the widened sections of the housing being sealed off from the first space because the caps are sealingly joined to the widened sections, so that a sealing is produced to the outside by the cap edge, and a sealing is produced with respect to the first space by the circumferential sealing ring. This type of arrangement of the connection pieces at the second space formed by the housing is relatively costly. Furthermore, dead spaces which are poorly rinsed develop above or below the connection pieces, at which gas bubbles can collect. This can have a disadvantageous effect during disinfecting or sterilization, as well as generally when handling.

OBJECTS AND SUMMARY OF THE INVENTION

Therefore, the object of the invention is to produce a filter device of the type specified at the outset in which, on one hand, it is reliably assured that the two flow spaces are sealed off from one another by the hardened molding compounds, and on the other hand, a simple arrangement of the connection pieces for the second flow space is produced and poorly rinsed dead spaces are moreover avoided.

This objective is achieved according to the invention, given a filter device having two flow spaces, the first space formed by tubular or capillary tube passages of a hollow-fiber bundle, said fiber bundle being poured at its ends into a molding compound, and a second space formed by the housing surrounding the fiber bundle. The invention further entails the first space being sealed off by caps, placed on the molding compounds, with sealing devices being placed over the peripheral areas of the molding compounds, and the molding compounds being braced against the housing. The molding compounds are hardened in molds enclosing them at their end faces and peripheral sides to form disks. Caps are provided for the ends of the first space that seal to the molding compound and have a connection piece providing inflow/outflow access to the first space. A second set of caps, overlapping the first caps, is provided, said caps having a connection piece providing inflow/outflow access to the second space. The edges of the second caps being joined to the housing in a fluid tight manner, so that between the first and second set of caps, interspaces are formed, said interspaces being connected to the second space.

In the filter device according to the invention, the molding compounds are hardened in molds enclosing them on the face and at their sides, so that the molding compounds are able to shrink free of stress. As in the known filter device, the sealing between the disk-shaped molding compounds thus formed and the first caps is effected by inserted sealing means. However, to produce a simple access to the second flow space, the corresponding connection pieces are no longer arranged on the housing itself, but on the second cap overlapping the first cap. This simplifies the filter device.

The inner edges of the second caps overlapping the molding compounds advantageously extend beyond the molding compounds to the inside, so that a flow space is produced between the circumferential wall of the second caps and the molding compounds or the fiber bundles enclosed by them.

According to a preferred specific embodiment, the pipe-section-shaped housing, into which the hollow-fiber bundle is drawn, is provided at the ends of its casing with tooth-like or scalloped projections formed by axial notches or indentations running out freely, the outer areas of the projections being integrated into the molding compounds, so that the free inner areas of the notches or indentations form flow passages for the fluid. Since the housing, which is pipe-section-shaped or preferably provided with a circular cross-section, is made of a material having elastic properties such as PC (polycarbonate), wreath-shaped edges made of flexible tongues are formed by the notches or indentations, said edges being at least partially enclosed by the molding compound. When the molding compound then hardens to form the disks, they can shrink essentially free of stress, because the flexible tongues offer no significant resistance to this shrinking. According to this refinement of the present invention, the disks formed by the molding compounds are firmly joined to the ends of the tubular housing, so that the two flow chambers can then be reliably separated from one another by the two caps overlapping one another, with the appropriate sealing means.

It may be that the filter device known from EP 0 305 387 B1 has a tubular housing, in which wreath-shaped edges formed by notches or indentations are produced in the widened end sections and are partially enclosed by the molding compounds hardened to form disks. However, these wreath-shaped edges made of rectangular projections demand a complicated design of the housing, because in addition, they are still enclosed by the widened end sections of the housing which are provided with the connection pieces.

The housing is expediently provided in the area of the inner ends of the projections with radial flanges, on which the edges of the second caps are sealingly supported, or to which they are secured.

Advantageously, the distance of the projections from one another in the circumferential direction is greater than their width.

According to one inventive embodiment, for which independent protection is claimed, the cross-sectional area of the regions of the notches or indentations free of the molding compounds is so dimensioned that, starting from a radial connection piece, they increase in their cross-section, so that essentially equal partial quantities of the fluid can enter and exit through the cross-sections. This embodiment takes into account the circumstance that, in the annular space surrounding the fiber bundle and into which the liquid is fed through a radial connection piece, a pressure drop occurs in the circumferential direction starting from the mouth of the connection piece. Adjusting the cross-sections of the intake ports to this pressure drop assures that essentially equal quantities of fluid enter the openings distributed over the circumference.

A special problem in filter devices of the type indicated at the outset is assuring that in the second space, the surfaces of the fibers in the hollow-fiber bundle are circumflowed as completely and uniformly as possible by the introduced fluid, in order to increase the effectiveness of the filter device. Therefore, according to one particularly preferred specific embodiment of the invention, inserted into the housing are saucer-shaped rings whose legs are joined to the inside wall of the housing and which are provided with bore holes, and that the inside wall is provided with bore holes opening through into the annular spaces formed by the rings. An annular space is formed by the saucer-shaped ring, in which the introduced fluid can spread out well. The bore holes can be distributed uniformly over the periphery, in doing which the cross-sections of the bore holes can be adapted to the pressure drop occurring in the introduced fluid if it is fed into the annular space only through one bore hole or one radial connection piece.

To maintain an essentially uniform fluid pressure given a one-sided introduction of the fluid into the annular space, the bore holes and openings respectively having identical flow-through cross-sections can be distributed with appropriately variable clearances over the periphery of the inside wall of the annular space.

Advantageously, the rings have a U-shaped cross-section, the bore holes being arranged in the radial legs of the rings.

In the known filter device, the annular spaces formed by the annular grooves have an axial clearance with respect to the end disks formed by the molding compounds. Because of this, in the case of a vertically standing filter device, for example, air bubbles can collect at the upper disk formed by the molding compound. Furthermore, air bubbles can also collect in the lower annular groove between the mouth of the radial connection piece and the groove bottom. A result of this undesired collecting of air or air bubbles is that, for example, during sterilization or disinfection of the filter, the air-filled areas do not come in contact, or come only insufficiently in contact with the sterilizing or disinfecting means.

To achieve a complete deaeration of the hollow-fiber space, a further inventive development provides that the annular spaces or the passages connecting the annular spaces to the second space are joined directly to the molding compounds, or extend in the axial direction to their area.

This refinement of the present invention prevents dead spaces between the connection pieces and the annular spaces respectively into which they discharge, so that no air can accumulate in unwanted manner in dead spaces, and a complete circumcirculation of the hollow-fiber bundle by the fluid between the molding compounds is assured.

Expediently, both sides of the filter are identically shaped, so that the effects provided according to the invention are attainable in any position of the filter.

The embodiment of the filter according to the invention also has a favorable effect on the discharge side of the second space, since the fluid is withdrawn from the second space essentially uniformly distributed over the annular space.

A further advantage of the present device is that its housing can be made of a material such as propylene which does not form a tight adhesive bond with the molding compound. Therefore, it is possible to produce the filter device according to the invention from less costly plastic materials, which increases its economic efficiency.

A further inventive refinement relates to a filter device having two flow spaces, of which a first space, preferably a permeate space, is formed by the tubular or capillary tube passages of a hollow-fiber bundle poured at its ends into a molding compound, and a second space, preferably a filtrate space, is formed by a housing enclosing the hollow-fiber bundle. The filtrate space is sealed off from the inlets and outlets of the tubes of the hollow-fiber bundle by the molding compound. Furthermore, at least two connection pieces are provided for the feeding and removal of fluids into or out of each of the two spaces, of which at least one connection piece of the second space opens through into an annular space formed between the housing and the area of one end of the hollow-fiber bundle. To assure that there is no dead space in the annular space in which air bubbles can collect, the present invention provides that in the position of normal use, at least one annular space is located at the top, and that the annular space extends to the supply line and discharge line respectively. Preferably dialysate can be fed or removed through the upper annular space.

In the following, an exemplary embodiment of the invention is explained in more detail with the aid of the drawings.

DESCRIPTION OF THE PREFERRED EMBODIMENT

Figure 1:
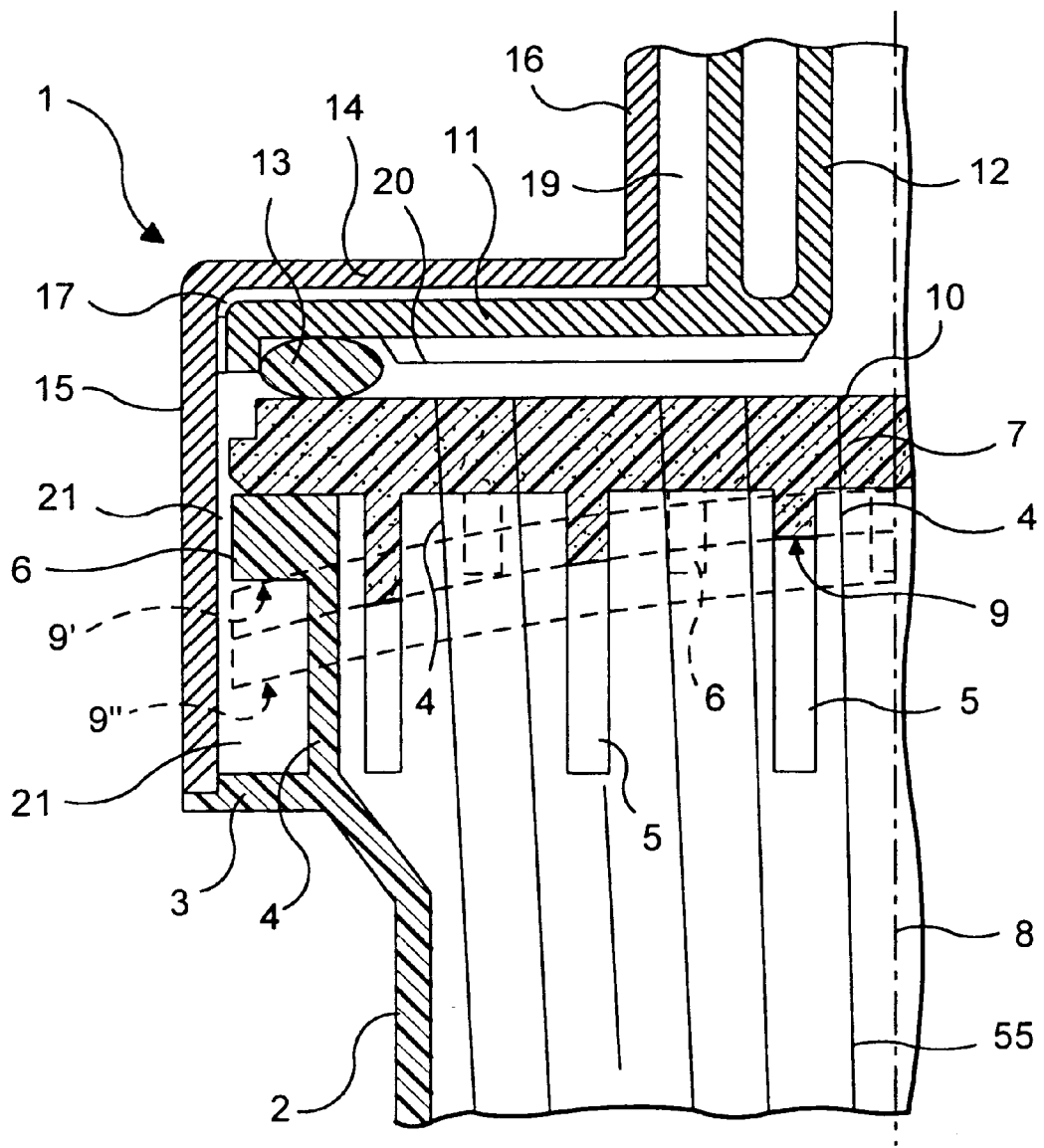
FIG. 1 shows a longitudinal cross-section through one side of a filter device according to the invention.

Filter device 1 is made of a pipe-section-shaped housing 2 of plastic such as PC, whose edges merge into a radial, annular flange 3. Joined to the housing, to the inner edge area of this flange 3 or to the transition region between the cylindrical pipe section and the flange, is a cylindrical ring which is provided with indentations 5 that form rectangular notches which run out freely. Formed between these notches 5 are scallop-like or tongue-like projections 4 which are likewise essentially rectangular and extend in the axial direction. At their upper, outer, end areas, these projections 4 have projections 6 pointing radially outwardly.

A hollow-fiber bundle 55 is introduced into pipe-shaped housing 2. The ends of this hollow-fiber bundle are embedded in a molding compound 7 made, for example, of PU, which is disk-shaped after hardening. Since during its hardening, the molding compound is centrifuged about an axis of rotation at right angles to housing axis 8, disk 7 in the top view evident from FIG. 1 has a cylindrical saucer-shaped inner side 9. The hardening is carried out in a cap which rotates along and which delimits the end face and the peripheral side. The tolerance range within which cylindrical, saucer-shaped, inner side 9 can move is indicated by broken lines 9' and 9".

After hardening the molding compound, disk 7 is cut at its end face 10, thus opening the small capillary tubes of the hollow-fiber bundle embedded in the molding compound.

A first cap 11 having a central connection piece 12 is then placed on end face 10 of disk 7, said cap being sealed off at its edge area, by means of an O-ring 13, from the edge area of disk 7 free of hollow fibers.

First cap 11 is enclosed by a second cap 14 having a cylindrical wall 15 whose edge area is joined in a fluid-tight manner to the outer edge of annular flange 3. Second cap 14 possesses a central, cylindrical extension prolongation 16 which forms a connection piece and concentrically encloses the double-walled connection piece 12 of first cap 11. Second cap 14 is provided on its inner side with ray-shaped webs 17 which assure the necessary clearance to first cap 11, and thus define flow channels. Cylindrical extension prolongation 16 is also provided on its inner side with radial webs 19 which are supported on the outer casing of connection piece 12 and define flow channels.

Radial webs 20, arranged in a star shape and used as stiffening, are provided on the lower side of first cap 11.

With its cylindrical edge 15, second cap 14 encloses, with radial clearance, disk 7 and scalloped or tooth-shaped extension prolongations 4, thus forming an annular space 21 through which the fluid, introduced through connection piece 16, can enter through the inner areas of ports 5 into the flow space enclosing the hollow-fiber bundle.

Figure 2:
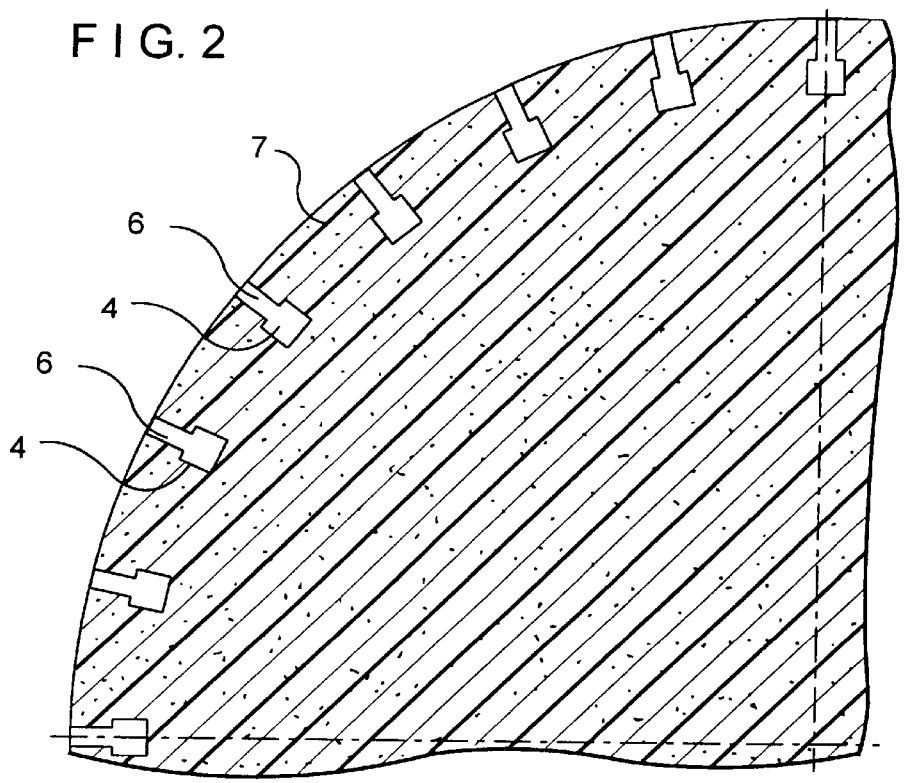
FIGS. 2 to 4 show top views onto one end face of a disk formed by the molding compound.
Figure 3:
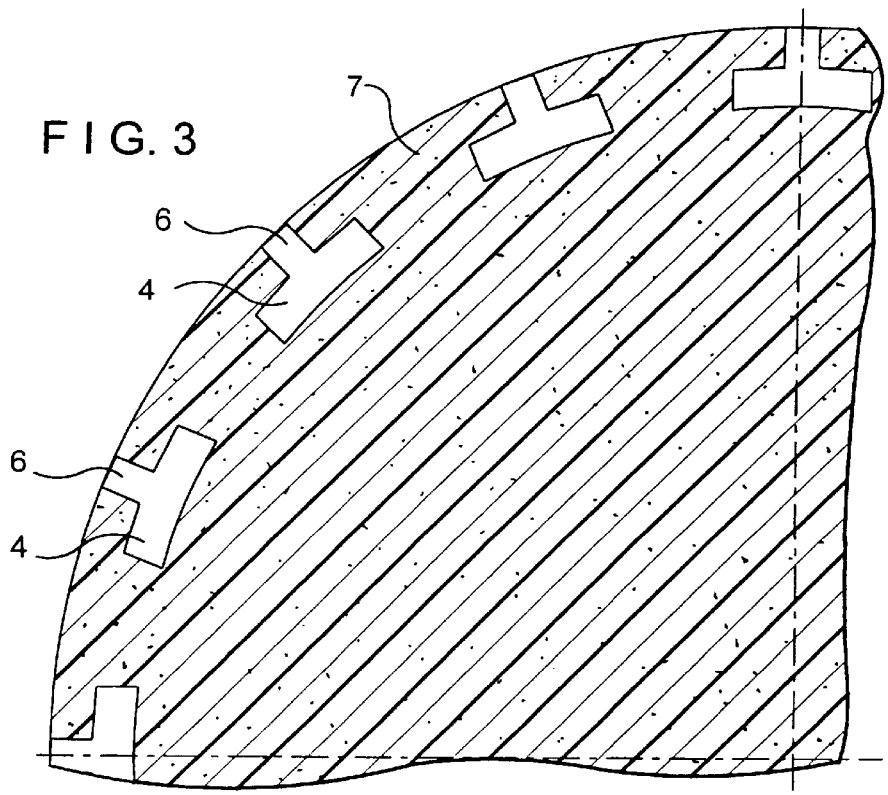
Figure 4:
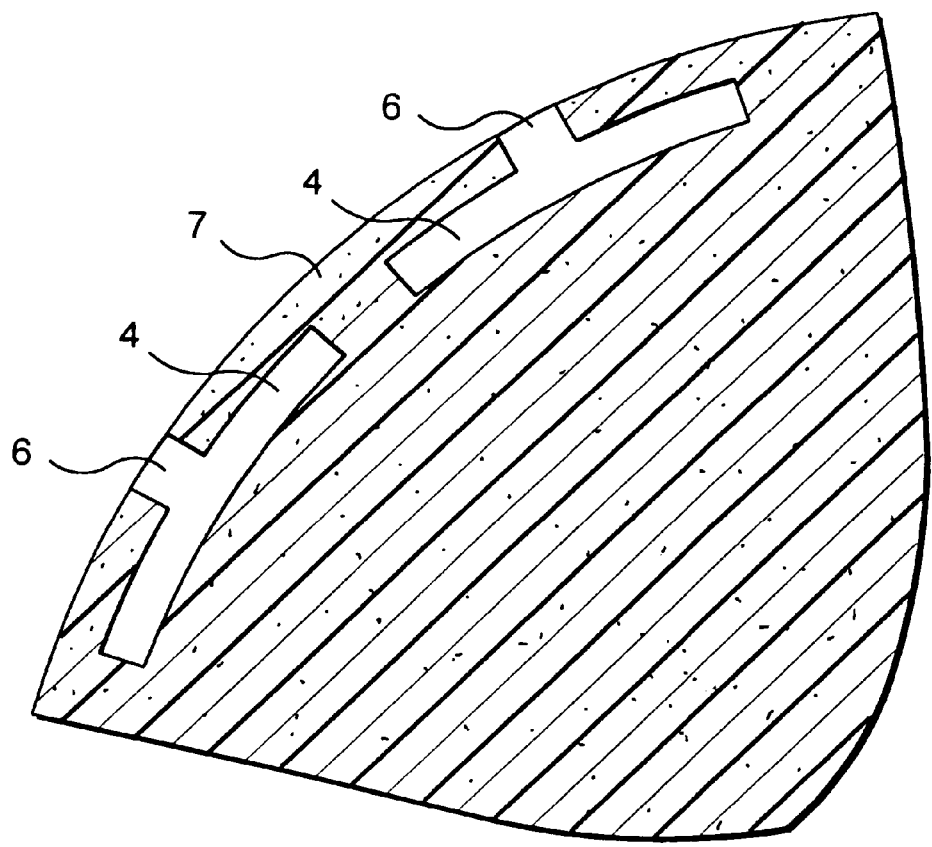

As FIGS. 2 to 4 show, the tooth-like or scallop-like projections 4 and gaps 5 formed between them can have different lengths and form different angles at circumference. The nose-shaped, radial projections 6 can also vary in length and width.

Figure 5:
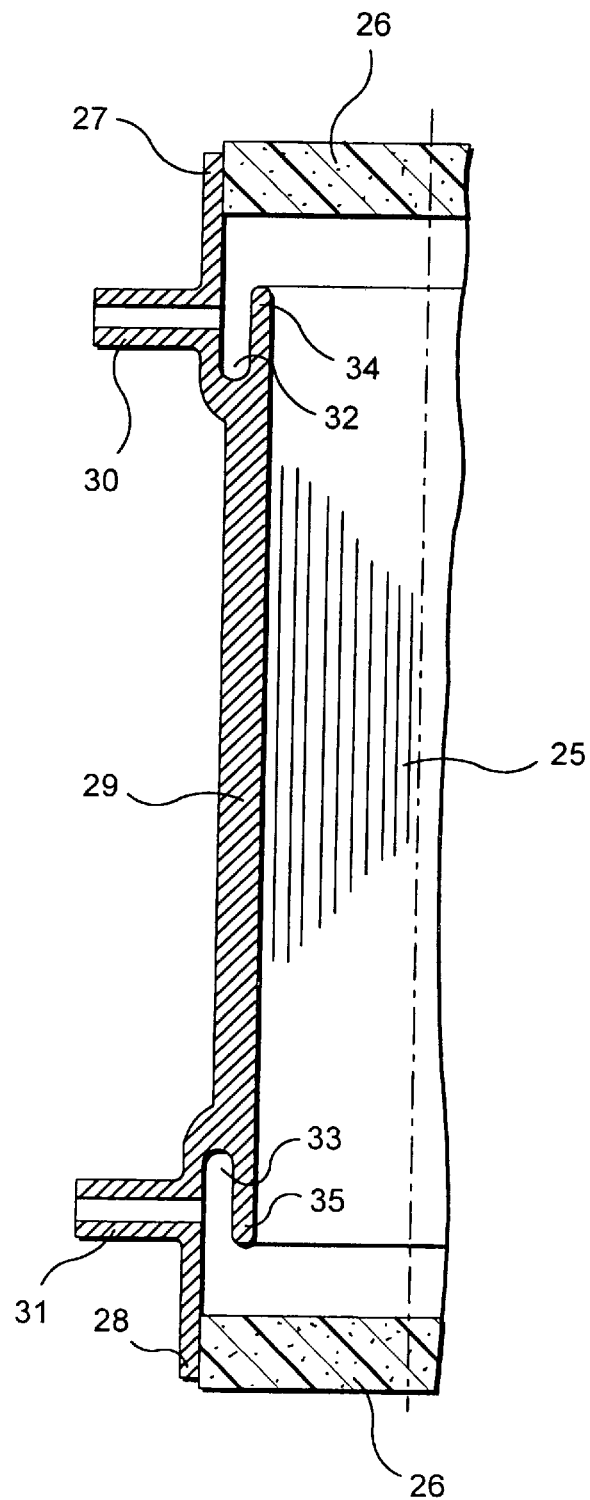
FIG. 5 shows a longitudinal cross-section through the housing of a known filter device.

FIG. 5 shows a longitudinal cross-section through the housing of a known dialyzer. In this known dialyzer, the ends of hollow-fiber bundle 25 are enclosed by the molding compounds which have hardened to form disks 26 and which form secure bonds to outer edges 27, 28 of housing 29. At a distance from disks 26, the housing is provided with radial connections 30, 31 that open into channel-shaped annular spaces 32, 33 which, in the manner shown, are formed by inner, ring-shaped wall sections 34, 35 which run out freely and whose edges terminate with axial clearance before the disks. If, for example, given a vertically standing housing, a fluid such as dialysate is introduced through lower radial connection piece 31 into the space accommodating hollow-fiber bundle 25, the fluid tends to overflow the edge of wall 35 bordering annular groove 33, mainly in the areas near connection piece 31, so that an unsymmetrical fluid flow, that is to say dialysate flow, develops in housing 29.

The filter device according to the invention, explained with the aid of FIGS. 1 to 4, prevents this unsymmetrical flow, because the fluid or dialysate spreads out in annular space 21 and then, essentially with uniform circumferential distribution, enters through the inner, free areas of inlet ports 5 into the space enclosing the hollow-fiber bundle. In the exemplary embodiment shown, annular space 21 is bounded outwardly by the cylindrical wall of cap 15, the cap being provided with an axial, concentrically arranged intake nipple, so that the fluid spreads out with equal pressure in annular space 21. Since an essentially equal fluid pressure occurs over the periphery of annular space 21, the intake ports formed by the free areas of inlet notches 5 can also have equal cross-sections.

Figure 6:
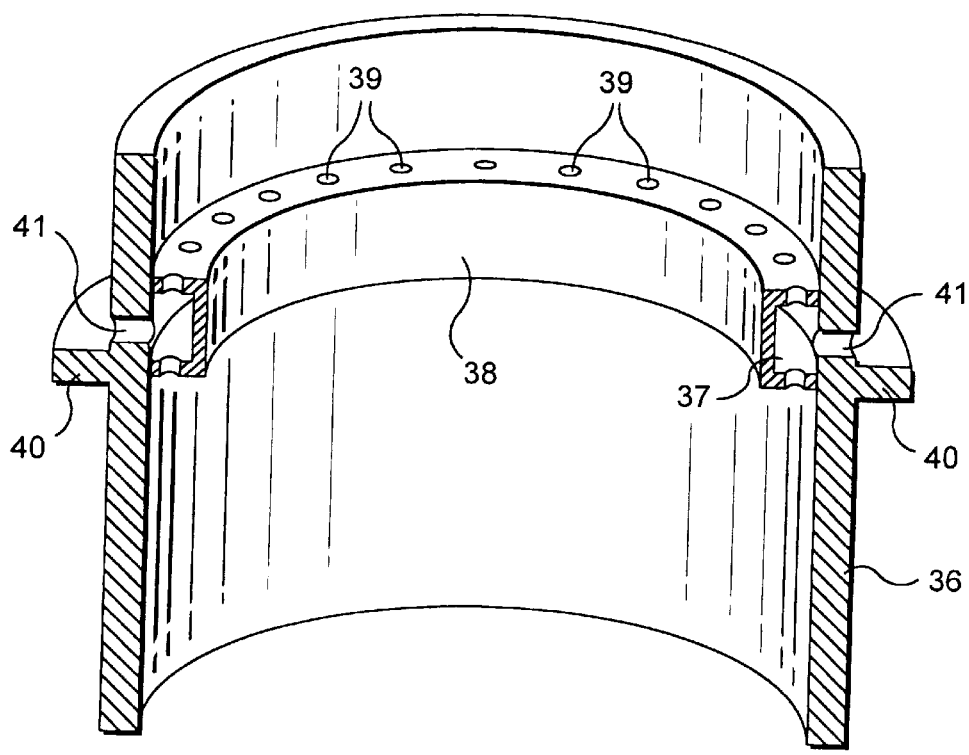
FIG. 6 shows a section through the upper area of the housing of a filter device according to the invention with closed annular space

In the exemplary embodiment according to FIG. 6, the fluid or the dialysate enters through radial bore holes 41 of pipe-section-shaped housing 36 into an annular space 37 which is formed by a U-shaped ring 38 whose outwardly-pointing legs are joined in a fluid-tight manner to the housing casing. Provided in the legs of U-shaped ring 38 are bore holes 39, uniformly distributed over the circumference, through which the fluid introduced into annular space 37 can enter into the chamber containing the hollow-fiber bundle.

The pipe-section-shaped housing is provided, in the area of the lower side of the annular space, with an outer, radially circumferential flange 40 upon which the edge of a cap can be placed, in a corresponding manner as in the case of the device described with the aid of FIGS. 1 to 4, so that between the cylindrical circumferential wall of the cap and the upper part of housing 6, an annular space is formed through which fluid can be conducted, with equal pressure distribution, to radial bore holes 35 distributed over the periphery of the housing.

Figure 7:
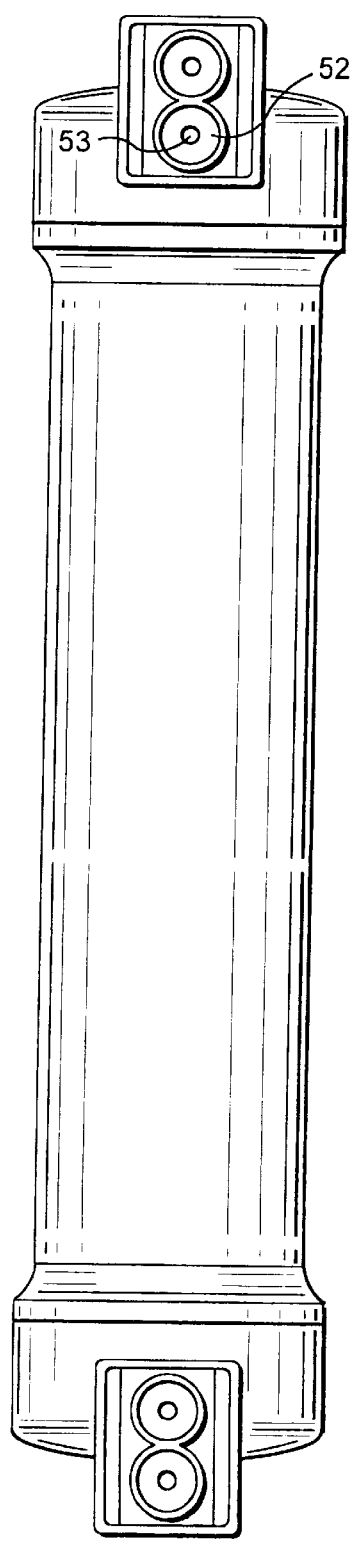
FIG. 7 shows a side view of a filter device according to the invention and FIG. 8 shows a section through the filter device according to FIG. 7.

FIG. 7 shows a side view of a filter device, in the case shown, a dialyzer. In this dialyzer, the connections or connection pieces used for connecting to the nozzles of a dialysis machine are located on one side and have center lines parallel to one another, so that they can be sealingly pressed, directly or through a suitable device, onto the nozzles of the dialysis machine.

Figure 8:
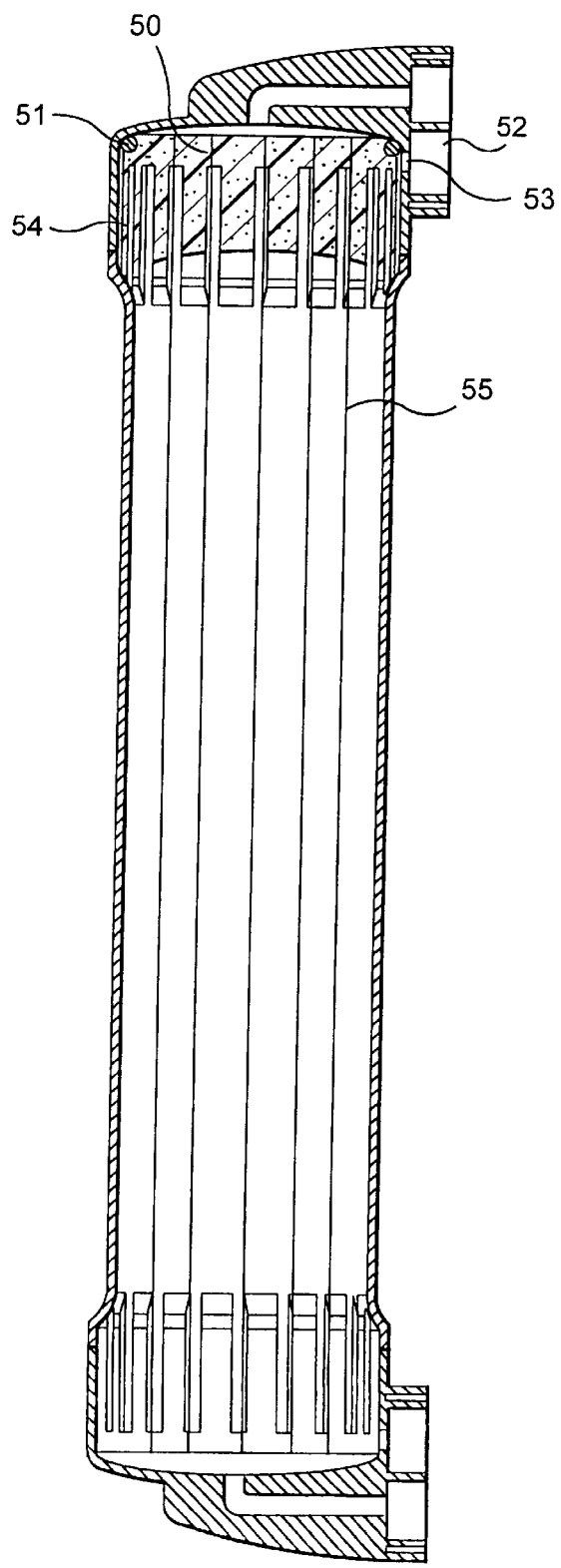

In the filter device evident from FIGS. 7 and 8, the upper and lower caps provided with the connections and connection pieces respectively are made of parts produced separately in the injection molding process whose edges are butt joined in a fluid-tight manner by suitable welded or adhesive joints to the edges of the housing which open out bell-shaped.

As is clear from FIG. 8, the blood chamber and the dialysate chamber surrounding hollow fibers 55 are separated by a molding compound 50. At its upper edge area, the molding compound has a circumferential groove into which an O-ring 51 is inserted to seal off the blood chamber from the dialysate chamber. As FIG. 8 clearly shows, opening 53 leading into connection piece 52 is joined directly to the lower side of O-ring 51, the annular space 54 used for the supply and removal of the dialysate extending to the O-seal, so that there is no dead space in which air bubbles could collect.

The function of the invention will be described using blood as an example of a fluid that requires the removal of impurities. According to the present invention, blood enters the first fluid flow space through a fluid port formed by connection piece 12. The blood then travels through the first fluid path, which extends through the molding compounds 7, 50, and exits through a second fluid port. During the course of traveling through the first fluid flow space the blood is cleaned of impurities, said impurities diffusing into and being carried away by the dialysate in the second fluid flow space.

Clean dialysate fluid is introduced into the second fluid flow space through an extension 16 of the second cap 14 or through fluid port 52. The dialysate spreads out in annular space 21, 54 and flows through notches 5 into the portion of the second flow path surrounding the first fluid flow path. Alternatively, the blood may flow through bore holes 41 into annular space 37 and then through second bore holes 39 into the portion of the second flow space surrounding the first flow space. The dialysate and the blood may flow in opposite directions (counter-current flow), or they may flow in the same direction. As the dialysate moves through the portion of the second flow space surrounding the first flow space, impurities diffuse from the blood into the dialysate and the impurity-laden dialysate exits the device through a second fluid port.

What is claimed is:

1. A filter device comprising a housing, a first fluid flow path contained in said housing, a molding compound adjacent the ends of the first fluid flow path, a first fluid port for fluid inflow and outflow from said first fluid flow path, a first cap joined to said molding compound and the first fluid port, a second cap connected to said housing and overlapping said first cap, a second fluid flow path between said first and second caps and in a space between the housing and the first fluid flow path, a second fluid port providing fluid inflow and outflow from the second fluid flow path, a ring having projections and having axial notches in fluid communication with said second fluid flow path.

2. The device of claim 1 wherein said housing is generally cylindrical in shape.

3. The device of claim 2 wherein said housing is widened at at least one end such that the portion of the housing joining said second cap has a diameter greater than the remainder of said housing.

4. The device of claim 2 wherein the housing has, near at least one end, a flange extending radially outwardly and connected to said second cap.

5. The device of claim 2 wherein said molding compound is a hardened disk.

6. The device of claim 2 wherein the outer margins of said projections are bound in the molding compound such that portions of said notches free of molding compound are in fluid communication with said second fluid flow path.

7. The device of claim 2 wherein said projections are scalloped or tooth-like.

8. The device of claim 2 wherein said projections have secondary projections extending radially outwardly from said projections.

9. The device of claim 2 wherein the circumferential distance between said projections is greater than the circumferential width of said projections.

10. The device of claim 6 wherein the cross-sectional area of said notches increases with the increasing circumferential distance of each notch from a fluid port positioned at a predetermined radial location.

11. The device of claim 10 wherein fluid flow through each of said notches is substantially equal when fluid is introduced from said fluid port.

12. The device of claim 1 wherein said first fluid flow path consists of a hollow-fiber bundle.

13. The device of claim 6 further comprising a saucer-shaped ring having radial legs with bore holes therein, said legs being connected to the inside wall of said housing, such that said notches open into an annular space defined by said saucer-shaped rings.

14. The device of claim 13 wherein the saucer-shaped rings are u-shaped.

15. The device of claim 2 wherein at least one of said first and said second fluid ports extends in an axial direction.

16. The device of claim 2 wherein at least one of said first and said second fluid ports extends in a radial direction.

17. The device of claim 6 wherein the ring is made of a material which does not form a tight adhesive bond with the molding compound.

18. The device of claim 17 wherein the ring is made of polypropylene.

19. The device of claim 2 wherein the molding compound is made of a polyurethane.

20. The device of claim 2 wherein the first cap is connected to the molding compound in a fluid-tight manner.

21. The device of claim 20 further comprising an o-ring between said first cap and said molding compound.

22. The device of claim 2 wherein said second cap is connected to said housing in a fluid-tight manner.

23. The device of claim 2 wherein the projections in said ring are bound in said molding compound and radial bore holes are provided in said housing, said bore holes in fluid communication with said second fluid flow path.

24. The device of claim 23 further comprising a saucer-shaped ring having radial legs with bore holes therein, said legs being joined to the inside wall of said housing, such that said bore holes open into an annular space defined by said saucer-shaped rings.

25. A dialysis filter comprising a housing, a first fluid flow path contained in said housing, a molding compound adjacent the ends of the first fluid flow path, a first fluid port for fluid inflow and outflow from said first fluid flow path, a first cap joined in a fluid-tight manner to said molding compound and the first fluid port, a second cap connected to said housing in a fluid tight manner and overlapping said first cap, a second fluid flow path located between said first and second caps and further located in a space between the housing and the first fluid flow path, said housing widened at one or both ends such that the portion of the housing connected to said second cap has a diameter greater than the remainder of said housing, a second fluid port providing fluid inflow and outflow from the second fluid flow path, a ring having projections and having axial notches, the margins of said projections being bound in said molding compound such that a portion of said notches is free of molding compound, the portion of said notches free of molding compound being in fluid communication with said second fluid flow path.

26. The device of claim 25 wherein said housing has, adjacent the widened portion of said housing, an annular flange extending radially outwardly, said second caps being connected to said flange in a fluid-tight manner.

27. The device of claim 25 wherein said projections are bound in molding compound and bore holes are provided in said housing, said bore holes in fluid communication with said second fluid flow path.

28. The device of claim 25 further comprising a saucer-shaped ring having radial legs with bore holes therein, said legs being joined to the inside wall of said housing, such that the annular space formed by said saucer-shaped ring is in fluid communication with said second fluid flow path.

29. The device of claim 25 wherein said fluid ports are axially oriented.

30. The device of claim 25 wherein said fluid ports are radially oriented.

31. The device of claim 25 wherein the cross-sectional area of the free portions said notches increases with the increasing circumferential distance of each notch from a fluid port positioned at a predetermined radial location, such that fluid flow through each of said notches is substantially equal when fluid is introduced from said radially located fluid port.

32. The device of claim 27 wherein the cross-sectional area of the bore holes increases with the increasing circumferential distance of each bore hole from a fluid port positioned at a predetermined radial location, such that fluid flow through each of the bore holes is substantially equal when fluid is introduced from said radially located fluid port.

33. The device of claim 25 wherein said first flow path consists of a hollow-fiber bundle.

34. A method of filtering a fluid comprising the step of providing a filter device comprising a housing, a first fluid flow path contained in said housing, a molding compound adjacent the ends of the first fluid flow path, a first fluid port for fluid inflow and outflow from said first fluid flow path, a first cap joined to said molding compound and the first fluid port, a second cap connected to said housing and overlapping said first cap, a second fluid flow path between said first and second caps and in a space between the housing and the first fluid flow path, a second fluid port providing fluid inflow and outflow from the second fluid flow path, a ring having projections and having axial notches in fluid communication with said second fluid flow path, and further comprising the steps of flowing a first fluid through the first fluid flow path and flowing a second fluid through the second fluid flow path, impurities from said first fluid diffusing into and said second fluid, said second fluid with said impurities flowing out of said second fluid flow path through said second fluid port.

35. The method of claim 34 wherein the first and second fluids flow in counter-current.

36. The method of claim 34 further comprising the step of positioning the filter device, for at least a portion of the period of operation, such that gas bubbles cannot collect in said flow paths.

37. The method of claim 36 wherein said filter device is positioned vertically and said first and second fluid ports attach to fluid supply and discharge lines such that gas bubbles cannot collect in said flow paths.

38. The method of claim 34 further comprising the steps of flowing said first fluid through said molding compounds and through said first fluid flow path and exiting said device through said first fluid port, and flowing said second fluid into the second fluid flow path, said second fluid spreading out in the space between said first and second caps and flowing through said axial notches into the space between said housing and said first fluid flow path, said second fluid flowing over said first fluid flow path, said second fluid flowing through said notches into said space between said first and second caps and exiting said device.

39. The method of claim 34 wherein the projections in said ring are bound in said molding compound and radial bore holes are provided in said housing, said bore holes in fluid communication with said second fluid flow path, the device further comprising a saucer-shaped ring having radial legs with bore holes therein, said legs being joined to the inside wall of said housing, such that said bore holes open into an annular space defined by said saucer-shaped rings, said second fluid flowing from the space between said first and second caps through said bore holes in said housing into said annular space and through said bore holes in said radial legs into the space between said housing and said first fluid flow path.

40. A filter device comprising a housing, a first fluid flow path comprising a hollow fiber bundle contained in the housing, a molding compound adjacent the ends of the first fluid flow path, a second fluid flow path located between the housing and the first fluid flow path, a first fluid port in fluid communication with the first fluid flow path, a second fluid port in fluid communication with the second fluid flow path, the second fluid port oriented such that, during use, no air bubbles may collect in the second fluid flow path, a cap provided at each end of the housing and joined to the housing in a fluid-tight manner, and an annular space in fluid communication with said second fluid flow path and said second fluid port wherein the device further comprises a ring having projections and axial notches in fluid communication with said annular space.

41. The device of claim 40 wherein during normal use the second fluid port is in fluid communication with the top of the annular space.

42. The device of claim 40 wherein the second fluid port is oriented substantially parallel to the direction of fluid flow in the second fluid flow path.

43. The device of claim 40 wherein the second fluid port projects radially.

44. The device of claim 40 wherein the housing is widened each end such that the portion of the housing joining the caps has a diameter greater than the remainder of said housing.

45. The device of claim 40 wherein the first and second fluid flow paths are sealed off from one another by O-rings between the molding compounds and the caps.

46. The device of claim 45 wherein the molding compound has a circumferential groove into which the O-ring can be seated.

47. The device of claim 40 wherein the caps are produced by injection molding.

48. The device of claim 40 wherein the first and second fluid ports further comprise connection pieces constructed to sealingly press the ports into connection with a dialysis machine.

49. The device of claim 40 wherein the caps are butt-joined to the housing.

* * * * *